(12) United States Patent
Tsai

(10) Patent No.: US 9,855,795 B2
(45) Date of Patent: Jan. 2, 2018

(54) CLUTCH ASSEMBLY

(71) Applicant: TEKTRO TECHNOLOGY CORPORATION, Sioushuei Township, Changhua County (TW)

(72) Inventor: Szu-Fang Tsai, Taichung (TW)

(73) Assignee: Tektro Technology Corporation, Changhua County (TW)

( * ) Notice: Subject to any disclaimer, the term of this patent is extended or adjusted under 35 U.S.C. 154(b) by 90 days.

(21) Appl. No.: 14/826,621

(22) Filed: Aug. 14, 2015

(65) Prior Publication Data

US 2017/0045100 A1 Feb. 16, 2017

(51) Int. Cl.
*F16D 41/28* (2006.01)
*B60B 27/02* (2006.01)
*B60B 27/04* (2006.01)
*F16D 41/07* (2006.01)

(52) U.S. Cl.
CPC .......... *B60B 27/047* (2013.01); *B60B 27/023* (2013.01); *F16D 41/07* (2013.01); *F16D 41/28* (2013.01); *B60B 2900/311* (2013.01); *B60B 2900/321* (2013.01)

(58) Field of Classification Search
CPC ....... F16D 41/07; F16D 41/28; B60B 27/023; B60B 2900/311; B60B 2900/321; B60B 2900/331; B60B 27/047
See application file for complete search history.

(56) References Cited

U.S. PATENT DOCUMENTS

| 5,485,905 A | * | 1/1996 | Rader, III | B62M 11/00 192/41 A |
|---|---|---|---|---|
| 6,202,813 B1 | * | 3/2001 | Yahata | B60B 27/0005 192/46 |
| 2006/0219510 A1 | * | 10/2006 | Chung | F16D 41/064 192/45.004 |
| 2014/0225424 A1 | * | 8/2014 | Gerhardt | F16D 41/28 301/110.5 |

* cited by examiner

*Primary Examiner* — Ramya Burgess
*Assistant Examiner* — Lillian Nguyen
(74) *Attorney, Agent, or Firm* — Muncy, Geissler, Olds & Lowe, P.C.

(57) ABSTRACT

A clutch assembly includes an axle, a gear seat, at least one one-way bearing, an outer limiting sleeve and a hub. The gear seat is rotatably positioned around the axle. The at least one one-way bearing includes an outer race and an inner race. The inner race is securely fitted around the gear seat. The outer race is rotatably positioned around the inner race. The outer race is rotatable relative to the inner race in only one direction. The outer limiting sleeve is securely fitted around the outer race. The hub is securely fitted around the outer limiting sleeve.

6 Claims, 14 Drawing Sheets

CLUTCH ASSEMBLY

TECHNICAL FIELD

The disclosure relates to a clutch assembly, more particularly to a clutch assembly having at least one one-way bearing as a clutch.

BACKGROUND

A conventional bicycle has a hub, a gear and a clutch positioned at a rear end of the bicycle. The clutch connects the hub and the gear. The rotational drive force generated by a bicycle rider transmits from the pedals to the gear through the chain so that the gear is able to drive the hub to rotate through the clutch. However, when the rotational drive force generated by the bicycle rider disappears, such as the rider stops pedaling the pedals or pedals the pedals in an opposite direction, the clutch disconnects the hub and the gear so that the hub keeps rotating relative to the gear, freely.

A ratchet assembly is used as a clutch in conventional bicycles. The ratchet assembly includes a pawl seat on which a plurality of steel pawls are installed and a gear with a plurality of teeth. The steel pawls slantingly protrude out from the surface of the pawl seat at an interval between each of the steel pawls. The teeth protrude out from the gear surface at an interval between each tooth. Each tooth of the gear has one edge with a moderate slope and another edge with a steep slope. The steel pawls engage with the teeth, respectively. When the pawl seat is rotating relative to the gear in the restricted direction, i.e., rotating forward, the steel pawls catch against the edges of the teeth with the steep slope, respectively, so that the pawl seat cannot rotate relative to the gear in the restricted direction. When the pawl seat is rotating relative to the gear in the unrestricted direction, i.e., rotating backward, the steel pawls easily slide across the edges of the teeth of the gear with the moderate slope, respectively, so that the pawl seat can freely rotate relative to the gear in the unrestricted direction.

However, there are intervals between the steel pawls on the pawl seat and the teeth of the gear in the conventional ratchet assembly. When the pawl seat is rotating relative to the gear in the restricted direction, the pawl seat needs to rotate about an angle relative to the gear before the steel pawls can mesh with the edges of the teeth with the steep slope, respectively. Therefore, the steel pawls may not catch on the teeth in time, causing the rotational energy to be transmitted discontinuously.

Moreover, when the pawl seat is rotating relative to the gear in the unrestricted direction, interference is generated at the contact surface between the steel pawls and the teeth, respectively, because the steel pawls need to slide across the edges of the teeth. Therefore, the interference may waste energy when the conventional ratchet assembly is used as a clutch.

SUMMARY

According to one embodiment of the present disclosure, a clutch assembly includes an axle, a gear seat, at least one one-way bearing, an outer limiting sleeve and a hub. The gear seat is rotatably positioned around the axle. The at least one one-way bearing includes an outer race and an inner race. The inner race is securely fitted around the gear seat. The outer race is rotatably positioned around the inner race. The outer race is rotatable relative to the inner race in only one direction. The outer limiting sleeve is securely fitted around the outer race. The hub is securely fitted around the outer limiting sleeve.

According to another embodiment of the present disclosure, a clutch assembly includes an axle, a hub, at least one one-way bearing, an outer limiting sleeve and a gear seat. The hub is rotatably positioned around the axle. The at least one one-way bearing includes an outer race and an inner race. The inner race is securely fitted around the hub. The outer race is rotatably positioned around the inner race. The outer race is rotatable relative to the inner race in only one direction. The outer limiting sleeve is securely fitted around the outer race. The gear seat is securely fitted around the outer limiting sleeve.

BRIEF DESCRIPTION OF THE DRAWINGS

The present disclosure will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
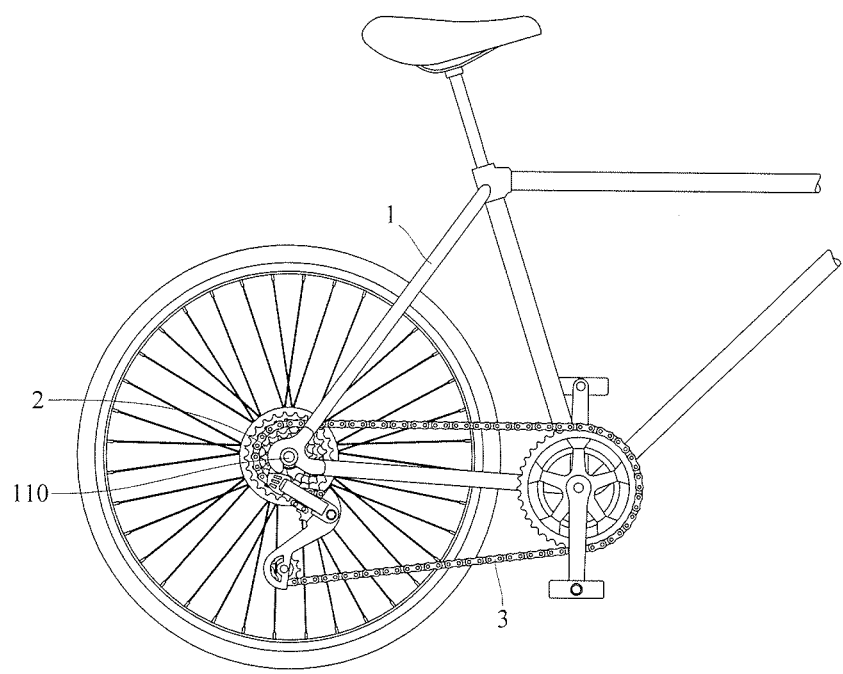
FIG. 1 is a partial view of a bicycle with a clutch assembly according to a first embodiment of the disclosure.
Figure 2A:
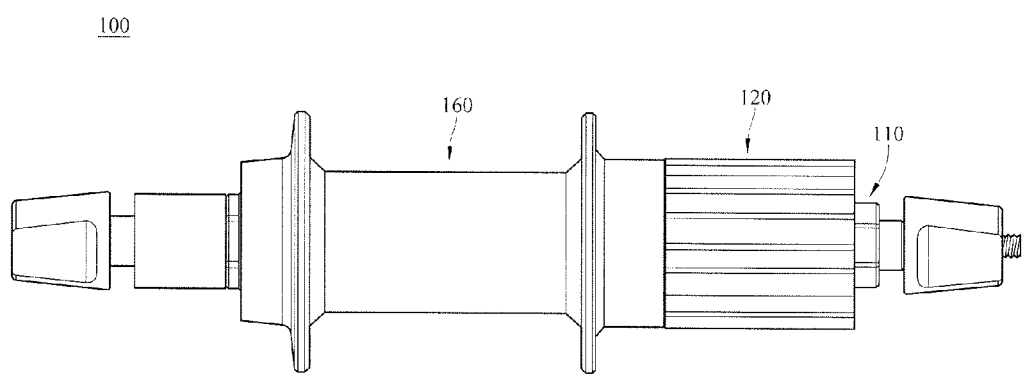
FIG. 2A is a side view of the clutch assembly according to the first embodiment of the disclosure.
Figure 2B:
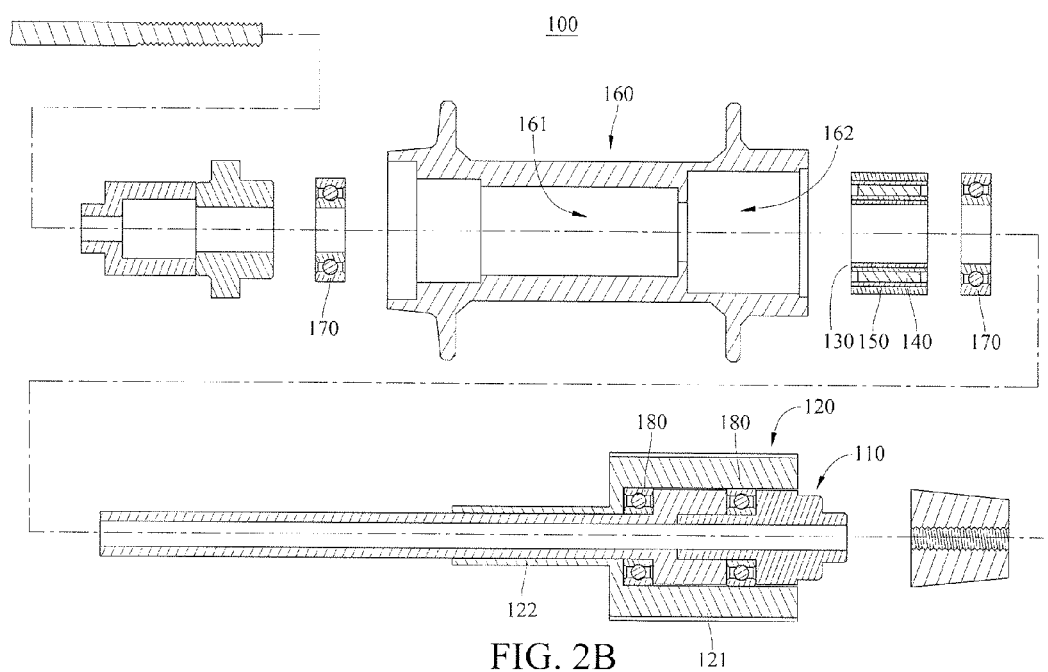
FIG. 2B is an exploded cross-sectional view of the clutch assembly according to the first embodiment of the disclosure.
Figure 3A:
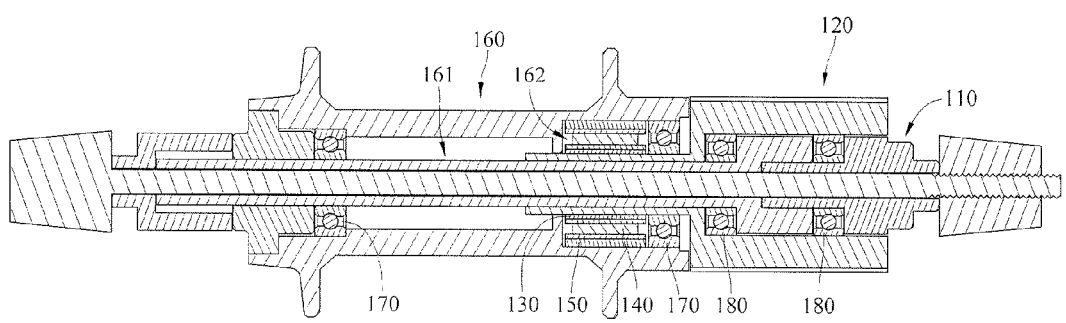
FIG. 3A is a cross-sectional view of the clutch assembly according to the first embodiment of the disclosure.
Figure 3B:
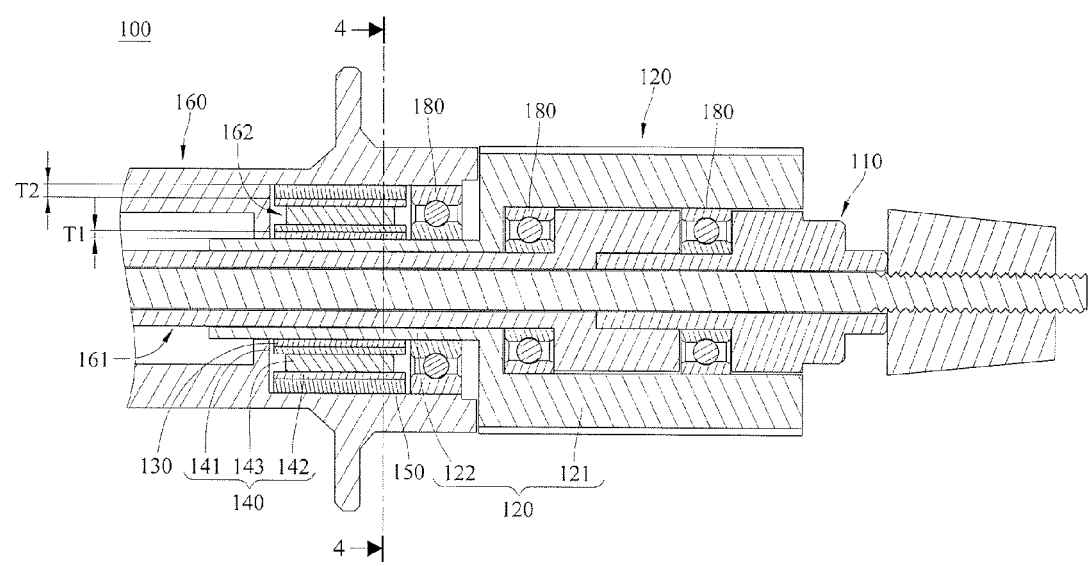
FIG. 3B is a partially cross-sectional view of the clutch assembly according to the first embodiment of the disclosure.
Figure 4:
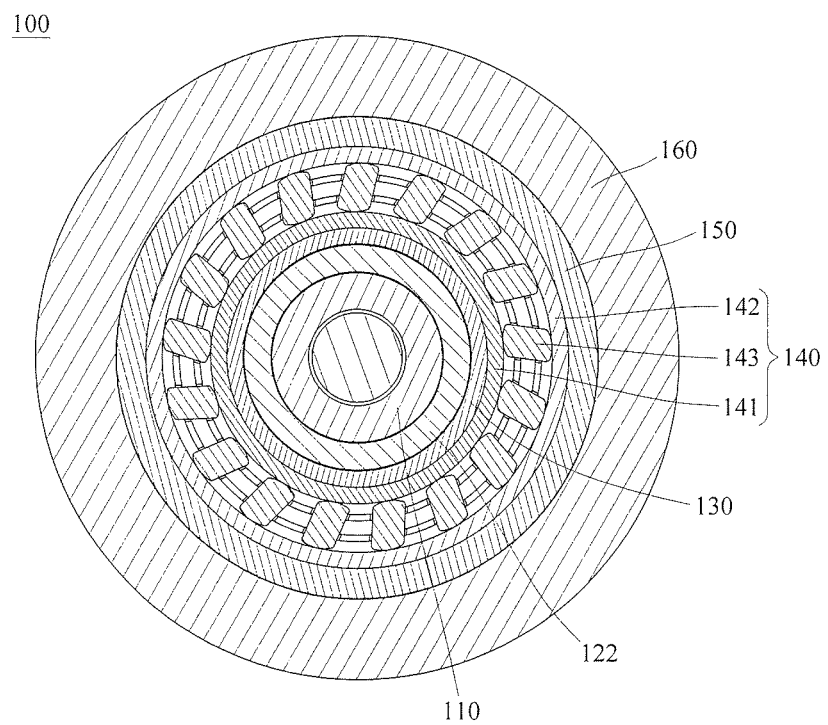
FIG. 4 is a cross-sectional view of the clutch assembly illustrated in FIG. 3B along a section line 4-4 according to the first embodiment of the disclosure.

The following describes the clutch assembly 100 of a first embodiment of the present disclosure. Please refer to FIG. 1 to FIG. 4. FIG. 1 is a partial view of a bicycle with a clutch assembly according to the first embodiment of the disclosure. FIG. 2A is a side view of the clutch assembly according to the first embodiment of the disclosure. FIG. 2B is an exploded cross-sectional view of the clutch assembly according to the first embodiment of the disclosure. FIG. 3A is a cross-sectional view of the clutch assembly according to the first embodiment of the disclosure. FIG. 3B is a partially cross-sectional view of the clutch assembly according to the first embodiment of the disclosure. FIG. 4 is a cross-sectional view of the clutch assembly illustrated in FIG. 3B along a section line 4-4 according to the first embodiment of the disclosure. In the first embodiment of the present disclosure, the clutch assembly 100 includes an axle 110, a gear seat 120, an inner limiting sleeve 130, a one-way bearing 140, an outer limiting sleeve 150, a hub 160, a plurality of first bearings 170 and a plurality of second bearings 180.

The axle 110 has relative two ends which are opposite to each other. The two ends of the axle 110 are fixed to a frame 1 of a bicycle. The gear seat 120 is rotatably positioned around one end of the axle 110. In detail, the gear seat 120 includes a gear installing part 121 and a clutch installing part 122 which are connected with each other. The gear installing part 121 and the clutch installing part 122 are positioned around the axle 110, and the gear installing part 121 and the clutch installing part 122 are able to freely rotate relative to the axle 110. The gear installing part 121 is the place where the gear 2 is installed. Therefore, a chain 3 is able to drive the gear seat 120 to rotate relative to the axle 110 through the gear 2 installed on the gear seat 120.

The inner limiting sleeve 130 is securely fitted around the clutch installing part 122 of the gear seat 120 such that the inner limiting sleeve 130 is able to simultaneously rotate with the clutch installing part 122 together. The inner limiting sleeve 130 has a first thickness T1. The inner limiting sleeve 130 is made of alloy with high stiffness such as steel or titanium alloy.

The one-way bearing 140 is positioned around the inner limiting sleeve 130. In other words, the inner limiting sleeve 130 is positioned between the one-way bearing 140 and the clutch installing part 122 of the gear seat 120. In detailed, the one-way bearing 140 includes an inner race 141, an outer race 142 and a plurality of sprags 143. The inner race 141 is securely fitted around the inner limiting sleeve 130. Specifically, the inner race 141 is closely fitted to a surface of the inner limiting sleeve 130. The outer race 142 is rotatably positioned around the inner race 141. The plurality of sprags 143 is located between the outer race 142 and the inner race 141 so that the inner race 141 is for rotating relative to the outer race 142 in only one direction. The plurality of sprags 143, for example, is a cam type, a gripper type or a roller type generally having a rectangular shape with rounded ends for engaging with the inner race 141 and outer race 142.

In detail, when the inner race 141 rotates relative to the outer race 142 in a restricted direction, i.e., rotating forward or rotating clockwise in FIG. 4, the sprags 143 engage with and fix to a side of the inner race 141 facing the outer race 142 and a side of the outer race 142 facing the inner race 141, simultaneously. Therefore, the inner race 141 drives the outer race 142 to rotate in the same direction through the sprags 143, synchronously. When the inner race 141 rotates relative to the outer race 142 in an unrestricted direction, i.e., rotating backward or rotating counterclockwise in FIG. 4, an interference between the sprags 143 and the inner race 141 and an interference between the sprags 143 and the outer race 142 are decreased. Therefore, a friction when the inner race 141 rotates relative to the outer race 142 decreases so that an energy loss when the inner race 141 rotates relative to the outer race 142 is decreased.

The outer limiting sleeve 150 is securely fitted around the outer race 142 of the one-way bearing 140, and the outer limiting sleeve 150 is closely fitted to a surface of the outer race 142 away from the inner race 141 such that the outer limiting sleeve 150 is able to simultaneously rotate with the outer race 142 together. The outer limiting sleeve 150 has a second thickness T2. The second thickness T2 of the outer limiting sleeve 150 is greater than the first thickness T1 of the inner limiting sleeve 130. The outer limiting sleeve 150 is made of alloy with high stiffness such as steel or titanium alloy. The stiffness of the inner limiting sleeve 130 and the stiffness of the outer limiting sleeve 150 are greater than the stiffness of the inner race 141 and the stiffness of the outer race 142 of the one-way bearing 140, respectively. As a result, the inner limiting sleeve 130 and the outer limiting sleeve 150 strengthen a structural strength of the inner race 141 and the outer race 142 of the one-way bearing 140, respectively. Therefore, the inner race 141 and the outer race 142 are strengthened to prevent the deformation from an external force, thereby improving the reliability of the one-way bearing 140 of the clutch assembly 100.

Generally, when the inner race 141 and the outer race 142 have the same thickness, a hollow area of the outer race 142 is larger than a hollow area of the inner race 141 so that the structural strength of the outer race 142 is weaker than the structural strength of the inner race 141. In other words, the resistance to deformation caused by an external force of the outer race 142 is weaker than the resistance to defoiniation caused by an external force of the inner race 141. Accordingly, since the second thickness T2 of the outer limiting sleeve 150 is greater than the first thickness T1 of the inner limiting sleeve 130, the resistance to deformation of the outer race 142 is enhanced. Therefore, the reliability of the one-way bearing 140 of the clutch assembly 100 is improved. In the first embodiment of the present disclosure, the thickness of the inner limiting sleeve 130 is smaller than the thickness of the outer limiting sleeve 150. However, the disclosure is not limited to the thickness relationship between the inner limiting sleeve 130 and the outer limiting sleeve 150. In other embodiments, the thickness of the inner limiting sleeve can be equal to or greater than the thickness of the outer limiting sleeve.

The hub 160 is rotatably positioned around the other end of the axle 110, and one end of the hub 160 is securely fitted around the outer limiting sleeve 150. In detail, the hub 160 has a through hole 161 and an installation recess 162. The installation recess 162 communicates with one end of the through hole 161. The inner diameter of the installation recess 162 is larger than the inner diameter of the through hole 161. The axle 110 penetrates through the through hole 161 and the installation recess 162. The clutch installing part 122 of the gear seat 120 rotatably positioned around the axle 110, the inner limiting sleeve 130 securely fitted around the clutch installing part 122, the inner race 141 of the one-way bearing 140 securely fitted around the inner limiting sleeve 130, and the outer limiting sleeve 150 securely fitted around the outer race 142 of the one-way bearing 140 are all installed in the installation recess 162. The hub 160 securely fits around a surface of the outer limiting sleeve 150 away from the one-way bearing 140.

When the gear seat 120 rotates relative to the axle 110 in the restricted direction, i.e., rotating forward, the gear seat 120 drives the hub 160 to rotate through the one-way bearing 140, simultaneously, so that the gear seat may not drive the hub to rotate in time and the rotational energy is transmitted discontinuously when using the conventional ratchet assembly as a clutch is avoided. When the gear seat 120 rotates relative to the axle 110 and drives the inner race 141 to rotate relative to the outer race 142 of the one-way bearing 140 in the unrestricted direction, i.e., rotating backward, or when the hub 160 rotates relative to the axle 110 and drives the outer race 142 to rotate relative to the inner race 141 of the one-way bearing 140 in the unrestricted direction, i.e., rotating backward, a interference between the sprags 143 and the inner race 141 and a interference between the sprags 143 and the outer race 142 are decreased. Accordingly, the hub 160 and the gear seat 120 can rotate relative to each other freely with smaller friction therebetween because of the one-way bearing 140. Therefore, the energy loss when the gear seat 120 rotates relative to the hub 160 in the unrestricted direction, i.e., rotating backward, is decreased.

In addition, a plurality of first bearings 170 is installed between the hub 160 and the axle 110 for facilitating the hub 160 to rotate relative to the axle 110. The first bearings 170, for example, are ball bearings or rod bearings. A plurality of second bearings 180 are installed between the gear seat 120 and the axle 110 for facilitating the gear seat 120 to rotate relative to the axle 110. The second bearings 180, for example, are ball bearings or rod bearings.

Figure 5:
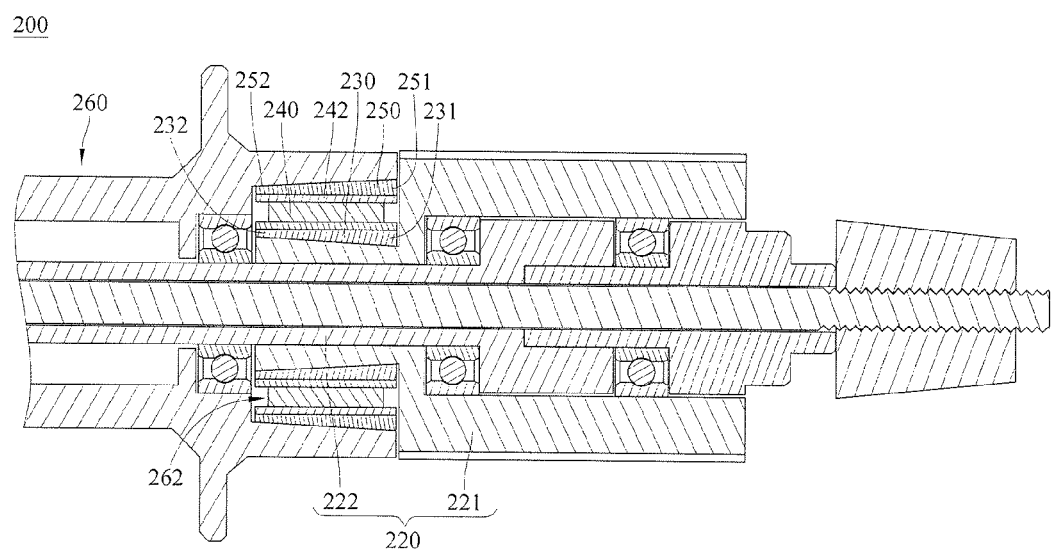
FIG. 5 is a partially cross-sectional view of a clutch assembly according to a second embodiment of the disclosure.

The following describes a clutch assembly 200 of a second embodiment of the present disclosure. Please refer to FIG. 5. FIG. 5 is a partially cross-sectional view of a clutch assembly according to a second embodiment of the disclosure. The second embodiment of the present disclosure in FIG. 5 is similar to the first embodiment of the present disclosure in FIG. 1 to FIG. 4. Therefore, the following descriptions focus on the difference between the clutch assembly 100 of the first embodiment and the clutch assembly 200 of the second embodiment. The explanations of the operations about the same structure of the first embodiment and the second embodiment of the present disclosure are not repeated herein.

In the clutch assembly 200, the outer limiting sleeve 250 is securely fitted around the outer race 242 of the one-way gearing 240. The outer limiting sleeve 250 has a first end 251 and a second end 252 which are opposite to each other. The first end 251 is closer to an edge of the hub 260 than the second end 252. The second end 252 is closer to a center of the hub 260 than the first end 251. In other words, the first end 251 is closer to the gear installing part 221 of the gear seat 220 than the second end 252, and the second end 252 is farther away from the gear installing part 221 of the gear seat 220 than the first end 251. The thickness of the outer limiting sleeve 250 is decreased from the first end 251 to the second end 252. The inner limiting sleeve 230 is securely fitted around the clutch installing part 222 of the gear seat 220. The inner limiting sleeve 230 has a third end 231 and a fourth end 232 which are opposite to each other. The third end 231 is closer to an edge of the hub 260 than the fourth end 232. The fourth end 232 is closer to a center of the hub 260 than the third end 231. In other words, the third end 231 is closer to the gear installing part 221 of the gear seat 220 than the fourth end 232, and the fourth end 232 is farther away from the gear installing part 221 of the gear seat 220 than the third end 231. The thickness of the inner limiting sleeve 230 is decreased from the third end 231 to the fourth end 232.

The structural strength of the area close to the opening of the installation recess 262 of the hub 260 is weaker than the structural strength of the interior area of the installation recess 262 when bearing an external force, and the structural strength of the one-way bearing 240 is also weak. Therefore, as the descriptions above, the first end 251 of the outer limiting sleeve 250 and the thickness of the third end 231 of the inner limiting sleeve 230 which are close to the opening area of the installation recess 262 are thicker than the thickness of the second end 252 of the outer limiting sleeve 250 and the fourth end 232 of the inner limiting sleeve 230 which are close to the interior of the hub 260, respectively. The structural strength of the area closed to the opening area of the installation recess 262 of the inner race 241 and outer race 242 of the one-way bearing 240 are improved so that the resistance to deformation caused by an external force of the inner race 541 and the outer race 542 are increased. As a result, the reliability of the clutch assembly 200 is improved.

Figure 6:
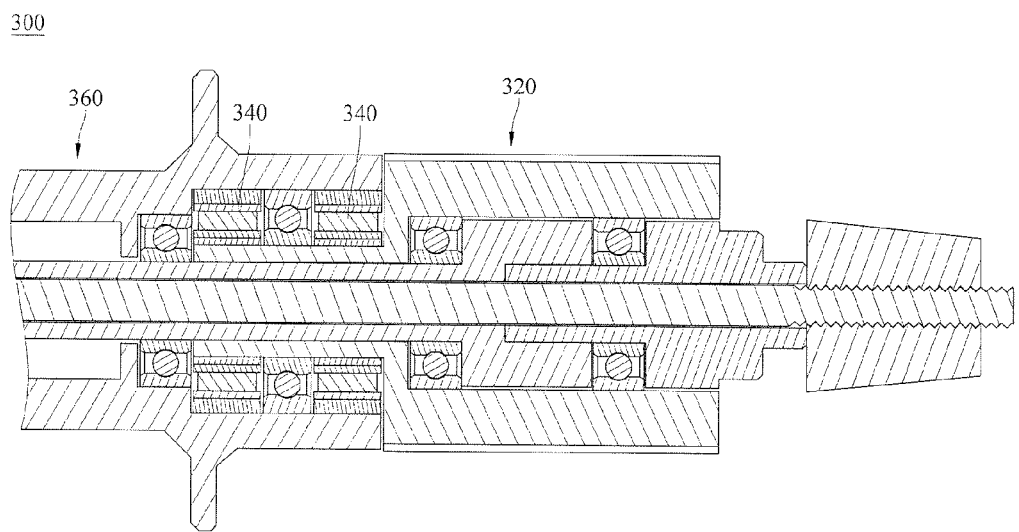
FIG. 6 is a partially cross-sectional view of a clutch assembly according to a third embodiment of the disclosure.

The following describes a clutch assembly 300 of a third embodiment of the present disclosure. Please refer to FIG. 6. FIG. 6 is a partially cross-sectional view of a clutch assembly according to a third embodiment of the disclosure. The third embodiment of the present disclosure in FIG. 6 is similar to the first embodiment of the present disclosure in FIG. 1 to FIG. 4. Therefore, the following descriptions focus on the difference between the clutch assembly 100 of the first embodiment and the clutch assembly 300 of the third embodiment. The explanations of the operations about the same structure of the first embodiment and the third embodiment of the present disclosure are not repeated herein.

In the clutch assembly 300 of this embodiment, the number of the one-way bearing 340 is two. When the number of the one-way bearing 340 is increased, an area of the one-way bearing 340 between the gear seat 320 and the hub 360 which is used as a power transmission area is increased. Therefore, a loading per unit area of the one-way bearing 340 is decreased because the total area thereof is increased. As a result, the abrasion of the one-way bearing 340 during operation is decreased so that the reliability of the clutch assembly 300 is improved.

Figure 7:
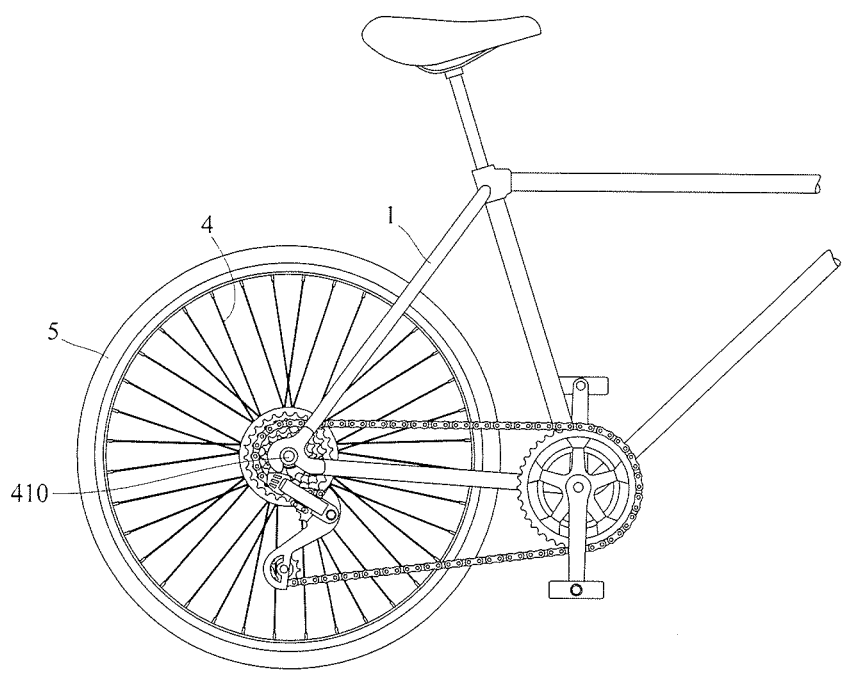
FIG. 7 is a partial view of a bicycle with a clutch assembly according to a fourth embodiment of the disclosure.
Figure 8A:
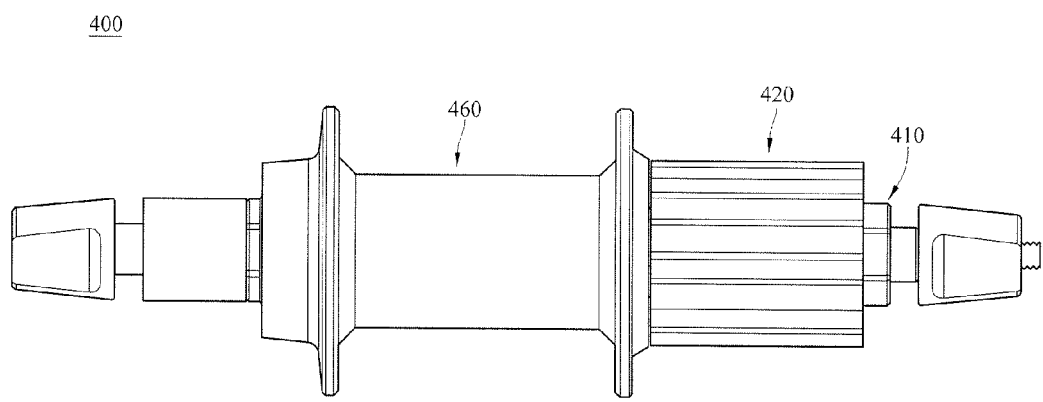
FIG. 8A is a side view of the clutch assembly according to the fourth embodiment of the disclosure.
Figure 8B:
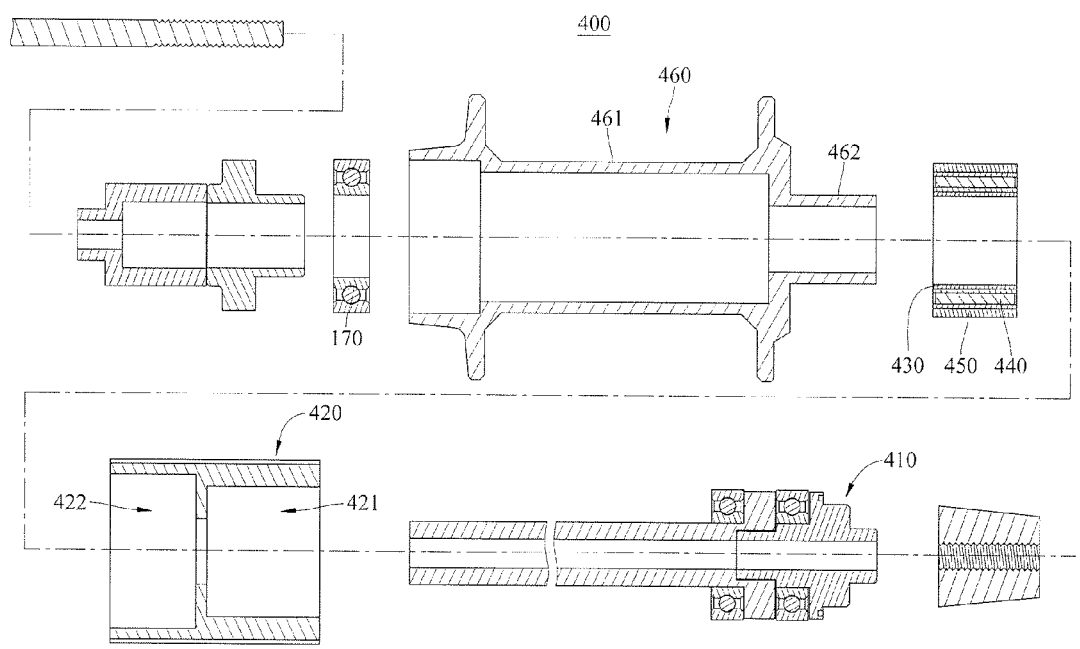
FIG. 8B is an exploded cross-sectional view of the clutch assembly according to the fourth embodiment of the disclosure.
Figure 9:
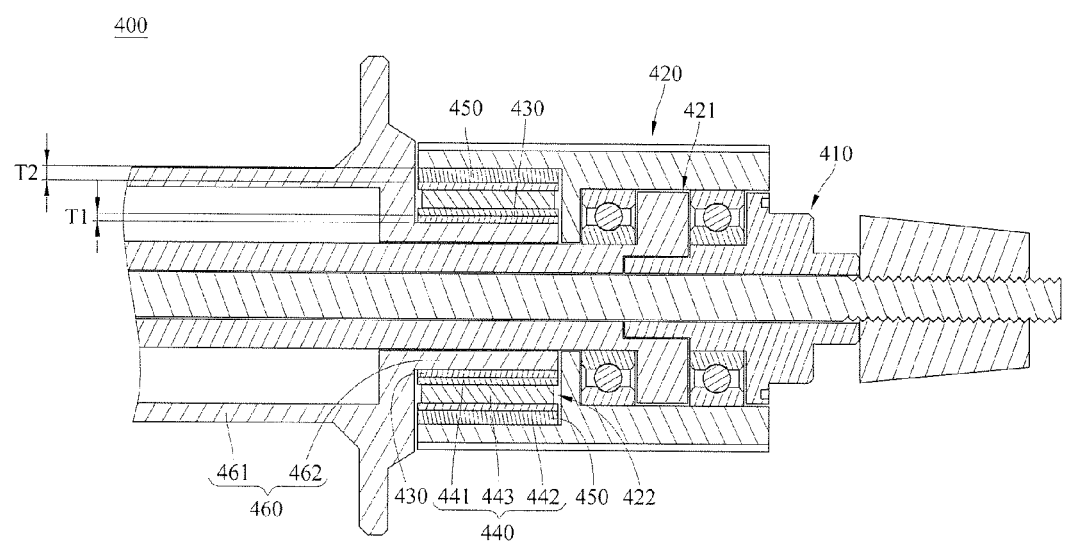
FIG. 9 is a partially cross-sectional view of the clutch assembly according to the fourth embodiment of the disclosure.

The following describes a clutch assembly 400 of a fourth embodiment of the present disclosure. Please refer to FIG. 7 to FIG. 9. FIG. 7 is a partial view of a bicycle with a clutch assembly according to a fourth embodiment of the disclosure. FIG. 8A is a side view of the clutch assembly according to the fourth embodiment of the disclosure. FIG. 8B is an exploded cross-sectional view of the clutch assembly according to the fourth embodiment of the disclosure. FIG. 9 is a partially cross-sectional view of the clutch assembly according to the fourth embodiment of the disclosure. The fourth embodiment of the present disclosure in FIG. 7 to FIG. 9 is similar to the first embodiment of the present disclosure in FIG. 1 to FIG. 4. Therefore, the following descriptions focus on the difference between the clutch assembly 100 of the first embodiment and the clutch assembly 400 of the fourth embodiment. The explanations of the operations about the same structure of the first embodiment and the fourth embodiment of the present disclosure are not repeated herein.

In the fourth embodiment of the present disclosure, the clutch assembly 400 includes an axle 410, a gear seat 420, an inner limiting sleeve 430, a one-way bearing 440, an outer limiting sleeve 450 and a hub 460. The axle 410 has two relative ends which are opposite to each other. The two ends of the axle 410 are fixed to a frame 1 of a bicycle. The hub 460 is rotatably positioned around one end of the axle 410. In detail, the hub 460 includes a base part 461 and a clutch installing part 462 which are connected with each other. The base part 461 and the clutch installing part 462 are positioned around the axle 410. The base part 461 and the clutch installing part 462 are able to freely rotate relative to the axle 410. The base part 461 is the installing position of a spokes 4. Therefore, a rim 5 is able to be installed on the hub 460 through the spokes 4 to form the wheel set of a bicycle.

The inner limiting sleeve 430 is securely fitted around the clutch installing part 462 of the hub 460. The inner limiting sleeve 430 has a first thickness T1. The one-way bearing 440 is positioned around the inner limiting sleeve 430. In other words, the inner limiting sleeve 430 is positioned between the one-way bearing 440 and the clutch installing part 462 of the hub 460. In detailed, the one-way bearing 440 includes an inner race 441, an outer race 442 and a plurality of sprags 443. The inner race 441 is securely fitted around the inner limiting sleeve 430, specifically, the inner race 441 is closely fitted to a surface of the inner limiting sleeve 430. The outer race 442 rotatably positioned around the inner race 441. The plurality of sprags 443 are located between the outer race 442 and the inner race 441 so that the inner race 441 is rotatably relative to the outer race 442 in only one direction. The outer limiting sleeve 450 is securely fitted around the outer race 442 of the one-way bearing 440, and the outer limiting sleeve 450 is closely fitted to a surface of the outer race 442 away from the inner race 441. The outer limiting sleeve 450 has a second thickness T2. The second thickness T2 of the outer limiting sleeve 450 is greater than the first thickness T1 of the inner limiting sleeve 430.

The gear seat 420 is rotatably positioned around the other end of the axle 410, and one end of the gear seat 420 is securely fitted around the outer limiting sleeve 450. In detail, the gear seat 420 has a through hole 421 and an installation recess 422. The installation recess 422 communicates with one end of the through hole 421. The inner diameter of the installation recess 422 is larger than the inner diameter of the through hole 421. The axle 410 penetrates through the through hole 421 and the installation recess 422. The clutch installing part 462 of the hub 460 rotatably positioned around the axle 410, the inner limiting sleeve 430 securely fitted around the clutch installing part 462, the inner race 441 of the one-way bearing 440 securely fitted around the inner limiting sleeve 430, and the outer limiting sleeve 450 securely fitted around the outer race 442 of the one-way bearing 440 are all installed in the installation recess 422. The gear seat 420 is securely fitted around the surface away from the one-way bearing 440 of the outer limiting sleeve 150.

When the gear seat 420 rotates and drives the outer race 442 of the one-way bearing 440 to rotate relative to the inner race 441 in the restricted direction, i.e., rotating forward, the outer race 442 drives the inner race 441 to rotate, simultaneously, so that the gear seat 420 drives the inner limiting sleeve 430 securely fitted around the inner race 441 and the hub 460 securely fitted around the inner limiting sleeve 430 in time. When the gear seat 420 rotates relative to the axle 410 so as to drives the outer race 442 to rotate relative to the inner race 441 of the one-way bearing 440 in the unrestricted direction, i.e., rotating backward, or when the hub 460 rotates relative to the axle 410 so as to drive the inner race 441 to rotate relative to the outer race 442 of the one-way bearing 440 in the unrestricted direction, i.e., rotating backward, a interference between the sprags 143 and the inner race 141 and a interference between the sprags 143 and the outer race 142 are decreased so that the one-way bearing 440 is able to reduce friction between the hub 460 and the gear seat 420 during rotation. Therefore, the energy loss when the gear seat 420 rotates relative to the hub 460 in the unrestricted direction, i.e., rotating backward, is decreased.

Figure 10:
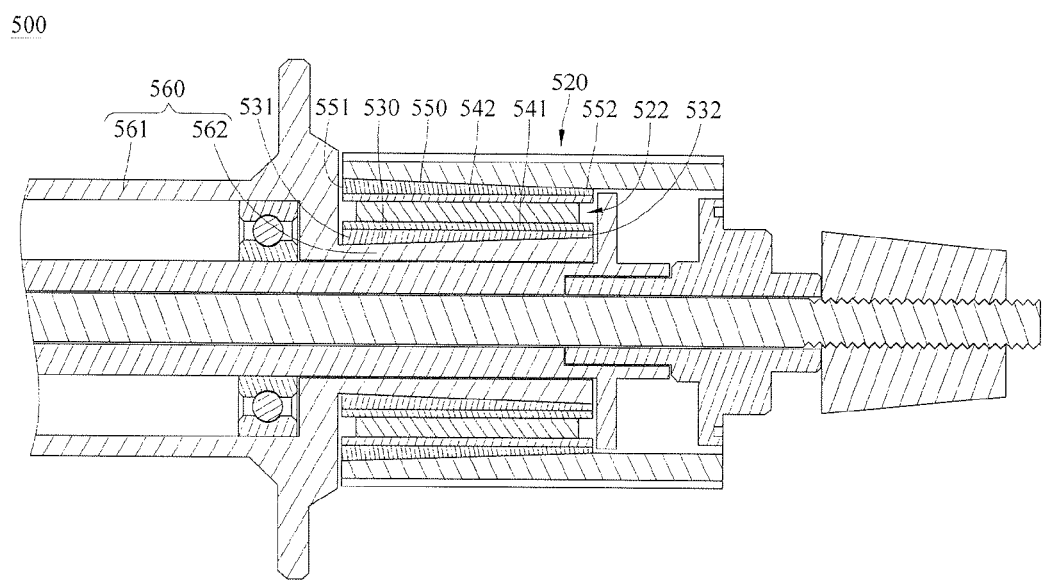
FIG. 10 is a partially cross-sectional view of a clutch assembly according to a fifth embodiment of the disclosure.

The following describes a clutch assembly 500 of a fifth embodiment of the present disclosure. Please refer to FIG. 10. FIG. 10 is a partially cross-sectional view of a clutch assembly according to a fifth embodiment of the disclosure. The fifth embodiment of the present disclosure in FIG. 10 is similar to the fourth embodiment of the present disclosure in FIG. 7 to FIG. 9. Therefore, the following descriptions focus on the difference between the clutch assembly 400 of the fourth embodiment and the clutch assembly 500 of the fifth embodiment. The explanations of the operations about the same structure of the fourth embodiment and the fifth embodiment of the present disclosure are not repeated herein.

In the clutch assembly 500, the outer limiting sleeve 550 is securely positioned around the outer race 542 of the one-way bearing 540. The outer limiting sleeve 550 has a first end 551 and a second end 552 which are opposite to each other. The first end 551 is closer to an edge of the gear seat 520 than the second end 552. The second end 552 is closer to a center of the gear seat 520 than the first end 251. In other words, the first end 251 is closer to the base part 561 of the hub 560 than the second end 252, and the second end 252 is farther away from the base part 561 of the hub 560 than the first end 251. The thickness of the outer limiting sleeve 550 is decreased from the first end 551 to the second end 552. The inner limiting sleeve 530 is securely fitted around the clutch installing part 562 of the hub 560. The inner limiting sleeve 530 has a third end 531 and a fourth end 532 which are opposite to each other. The third end 531 is closer to an edge of the gear seat 520 than the fourth end 532. The fourth end 532 is closer to a center of the gear seat 520 than the third end 531. In other words, the third end 531 is closer to the base part 561 of the hub 560 than the fourth end 532, and the fourth end 532 is farther away from the base part 561 of the hub 560 than the third end 531. The thickness of the inner limiting sleeve 530 is decreased from the third end 531 to the fourth end 532.

The structural strength of the area close to the opening of the installation recess 522 of the gear seat 520 is weaker than the structural strength of the interior area of the installation recess 522 when bearing an external force, and the structural strength of the one-way bearing 540 is also weak. Therefore, as the descriptions above, the first end 551 of the outer limiting sleeve 550 and the thickness of the third end 531 of the inner limiting sleeve 530 which are close to the opening area of the installation recess 522 are thicker than the thickness of the second end 552 of the outer limiting sleeve 550 and the fourth end 532 of the inner limiting sleeve 530 which are close to the interior of the gear seat 520, respectively. The structural strength of the area that is close to the opening area of the installation recess 522 of the inner race 541 and the outer race 542 of the one-way bearing 540 are improved so that the resistance to the deformation caused by an external force of the inner race 541 and the outer race 542 are increased. As a result, the reliability of the clutch assembly 500 is improved.

Figure 11:
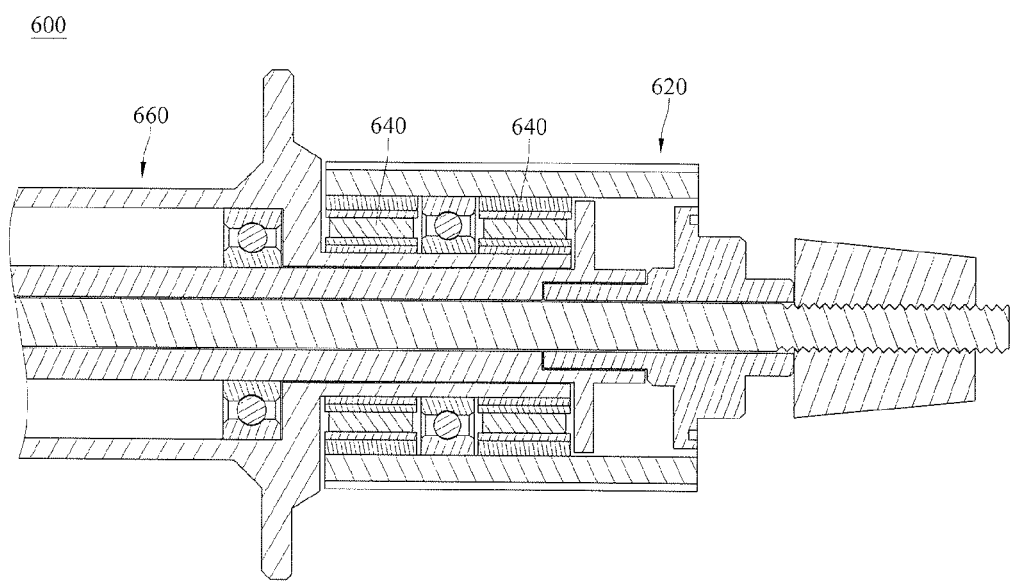
FIG. 11 is a partially cross-sectional view of a clutch assembly according to a sixth embodiment of the disclosure.

The following describes a clutch assembly 600 of a sixth embodiment of the present disclosure. Please refer to FIG. 11. FIG. 11 is a partially cross-sectional view of a clutch assembly according to a sixth embodiment of the disclosure. The sixth embodiment of the present disclosure in FIG. 11 is similar to the fourth embodiment of the present disclosure in FIG. 7 to FIG. 9. Therefore, the following descriptions focus on the difference between the clutch assembly 400 of the fourth embodiment and the clutch assembly 600 of the sixth embodiment. The explanations of the operations about the same structure of the fourth embodiment and the sixth embodiment of the present disclosure are not repeated herein.

In the clutch assembly 600 of this embodiment, the number of the one-way bearing 640 is two. When the number of the one-way bearing 640 is increased, an area of the one-way bearing 640 between the gear seat 620 and the hub 660 which is used as a power transmission area is increased. Therefore, a loading per unit area of the one-way bearing 640 is decreased because the total area thereof is increased. As a result, the abrasion of the one-way bearing 640 during operation is decreased so that the reliability of the clutch assembly 600 is improved.

According to the clutch assembly disclosed in the embodiments of the disclosure, using the one-way bearing to replace the ratchet assembly as a clutch solves the problem that the gear seat may not drive the hub to rotate in time and the rotational energy is transmitted discontinuously.

Moreover, the outer limiting sleeve is securely and tightly fitted around the outer race of the one-way bearing, and the inner race of the one-way bearing is securely and tightly fitted around the inner limiting sleeve. Therefore, resistances to deformation caused by an external force of the inner race and the outer race are improved by the outer limiting sleeve and the inner limiting sleeve. As a result, the reliability of the one-way bearing is improved so that the reliability of the clutch assembly is also improved.

What is claimed is:

1. A clutch assembly, comprising:
an axle;
a gear seat rotatably positioned around the axle;
at least one one-way bearing comprising an outer race and an inner race, the inner race securely fitted around the gear seat, the outer race rotatably positioned around the inner race, and the outer race being rotatable relative to the inner race in only one direction;
an outer limiting sleeve securely fitted around the outer race, and
a hub securely fitted around the outer limiting sleeve;
wherein the gear seat comprises a gear installing part and a clutch installing part, the hub has a through hole and an installation recess, one end of the through hole is communicated with the installation recess, the axle penetrates through the through hole and the installation recess, the clutch installing part is installed in the installation recess and rotatably positioned around the axle, the gear installing part is located out of the installation recess, and the inner race of the at least one one-way bearing is securely fitted around the clutch installing part.

2. The clutch assembly of claim 1, further comprising an inner limiting sleeve positioned between the gear seat and the inner race of the at least one one-way bearing, and the inner race of the at least one one-way bearing securely fitted around the inner limiting sleeve.

3. The clutch assembly of claim 2, wherein a thickness of the outer limiting sleeve is greater than a thickness of the inner limiting sleeve.

4. The clutch assembly of claim 1, wherein the outer limiting sleeve has an first end and a second end which are opposite to each other, the first end is closer to an edge of the hub than the second end, the second end is closer to a center of the hub than the first end, and a thickness of the outer limiting sleeve decreases from the first end to the second end.

5. The clutch assembly of claim 1, wherein a stiffness of the outer limiting sleeve is greater than a stiffness of the hub.

6. The clutch assembly of claim 1, wherein a number of the at least one one-way bearing is two.

* * * * *